United States Patent [19]

Dom

[11] Patent Number: 5,235,888
[45] Date of Patent: Aug. 17, 1993

[54] TIRE SIDEWALL CUTTING MACHINE

[76] Inventor: Thomas G. Dom, 6869 E. Vernon Ave., Scottsdale, Ariz. 85257

[21] Appl. No.: 881,819

[22] Filed: May 12, 1992

[51] Int. Cl.$^5$ ............................................. B26D 1/06
[52] U.S. Cl. ........................................ 83/420; 83/422; 83/425.2; 83/433; 83/618; 83/630; 83/733; 83/923; 83/951
[58] Field of Search ....................... 83/176, 425.2, 433, 83/490, 563, 618, 630, 632, 635, 733, 923, 951, 184, 187, 420, 422

[56] References Cited

U.S. PATENT DOCUMENTS

| | | | |
|---|---|---|---|
| 3,460,419 | 8/1969 | Branick | 83/490 X |
| 4,770,077 | 9/1988 | Garmater | 83/923 X |

FOREIGN PATENT DOCUMENTS

| | | | |
|---|---|---|---|
| 53-19034 | 6/1978 | Japan | 83/187 |
| 53-34235 | 9/1978 | Japan | 83/923 |

Primary Examiner—Hien H. Phan
Assistant Examiner—Raymond D. Woods

[57] ABSTRACT

A tire cutting machine that cuts the sidewalls from passenger car tires. The cutting operation is performed on both sidewalls simultaneously. The inner side of the tire tread rests on two rollers so that the tread becomes the reference point for the cutting blades. The tire tread is brought into contact with a drive wheel positioned on the outside of the tire tread and opposite one of the rollers on the inner side of the tire tread. The drive wheel causes the tire to rotate in a vertical plane. Two cutting blades (one on each side of the tire) are brought into contact with the sidewalls to sever them from the tread. As the cutting blades move towards the sidewalls, guide rollers move in unison with the cutting blades to center the tire between the blades and keep the tire centered as the sidewalls are cut.

1 Claim, 3 Drawing Sheets

TIRE SIDEWALL CUTTING MACHINE

FIELD OF THE INVENTION

This invention relates to the volume reduction of passenger car tires by removing the sidewalls from the tread leaving three separate pieces.

The removal of the tire sidewall from the tread is useful for either recycling or disposing of scrap tires. For the purpose of recycling scrap tires, the rubber in the sidewalls is the most desirable since it does not contain steel except in the rim bead area. Most tires have a steel belt in the tread. By removing the steel from the bead (by using the machine as disclosed in U.S. Pat. No. 4,770,077) and then using this sidewall cutting machine, the sidewalls can be recycled separately from the tread and beads. This "pure" rubber is easier to recycle than rubber which contains steel.

For the purpose of disposing of scrap tires, it is advantageous to reduce each tire's volume, thereby using less landfill space. By removing the tire sidewalls, the tire volume is reduced by approximately 70 percent.

SUMMARY OF THE INVENTION

The cutting operation is performed on both sidewalls simultaneously. The tire rotates in a vertical plane, resting on two rollers on the inner side of the tread. This design feature establishes the tread as the reference point for the cutting blades, allowing the machine to cut any size passenger car tire without modification or adjustment. To turn the tire, a drive wheel and an upper roller is brought down on the outer side of the tread opposite of the inner (lower) rollers. The tread is clamped between the drive wheel and the front lower roller thereby providing the necessary "traction" to turn the tire. As the tire rotates the cutting blades and guide rollers are brought into contact with the sidewalls. The guide rollers center the tire between the cutting blades so that both sidewalls are cut simultaneously.

BRIEF DESCRIPTION OF THE DRAWINGS

To explain the details of the machine the following figures will be used.

DESCRIPTION OF THE PREFERRED EMBODIMENT

Figure 1:
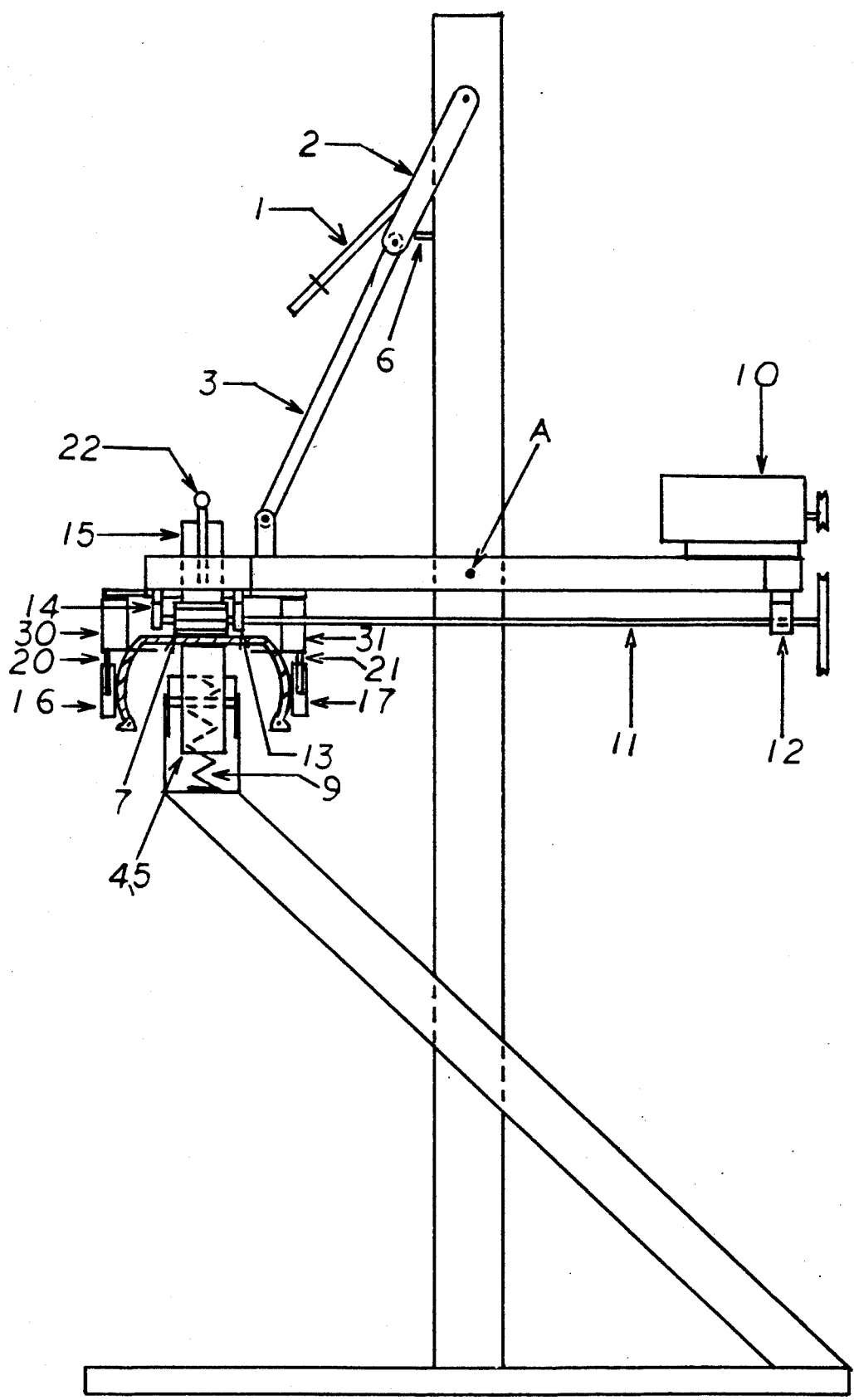
FIG. 1 is a side view with a partial cross section of a tire appearing as if it was being cut.
Figure 2:
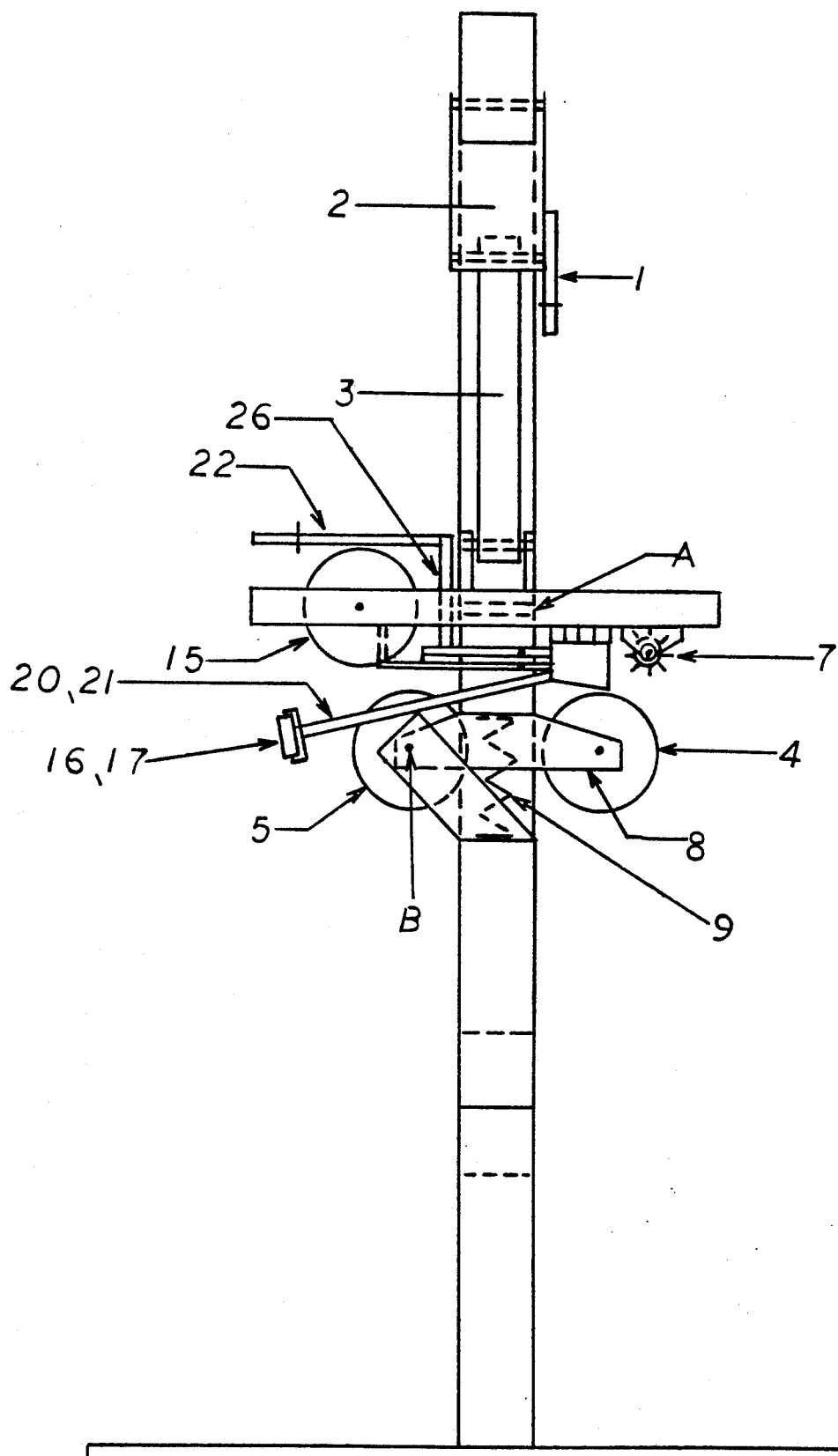
FIG. 2 is a front view with the motor and pulleys omitted for clarity.
Figure 3:
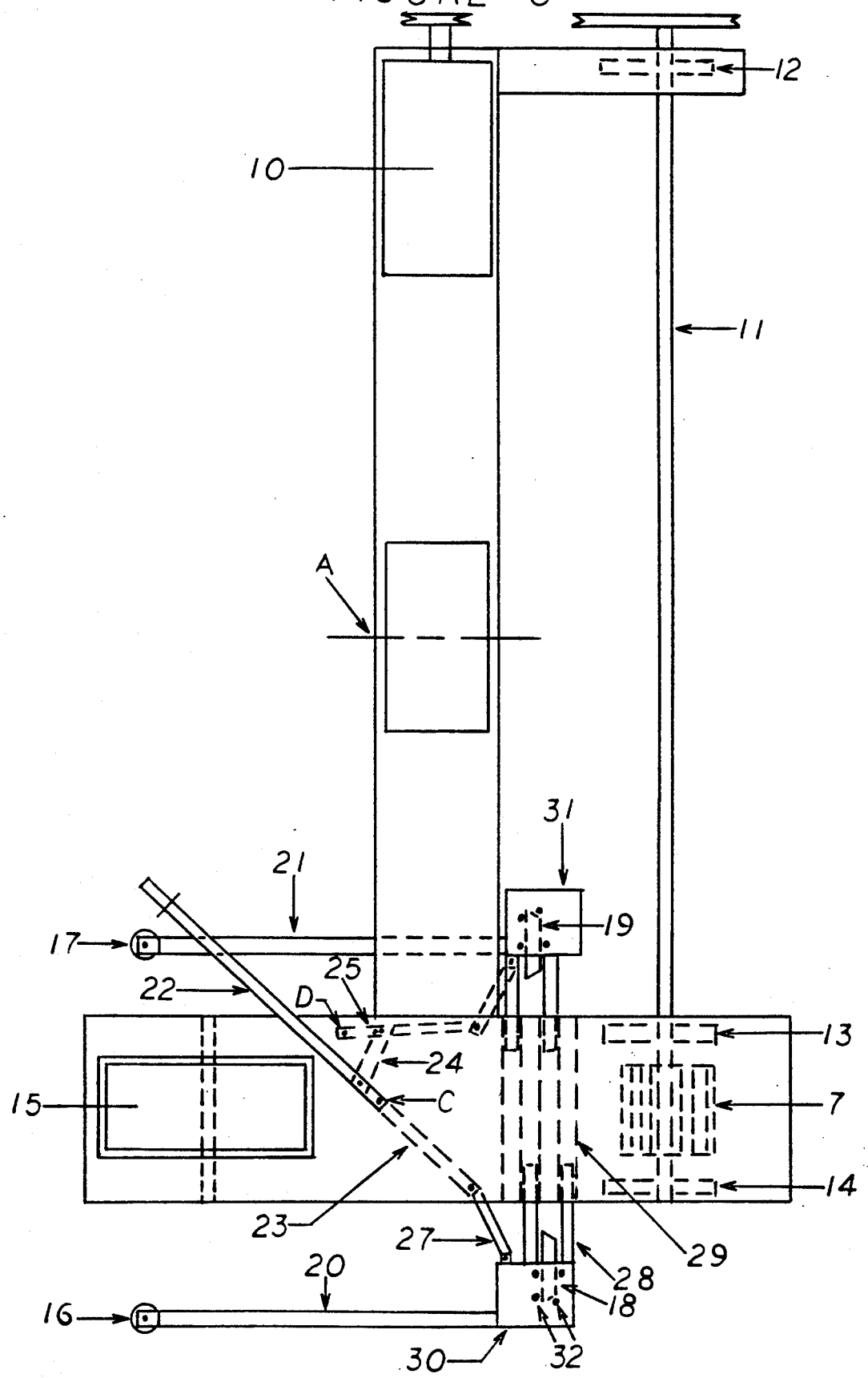
FIG. 3 is a top view of the cutting head assembly drawn on a larger scale.

Referring to FIGS. 1 and 2, the clamping lever 1 operates the links 2 and 3 which serves to pivot the cutting head assembly (as defined in FIG. 3) at point A. Thus, lifting the clamping lever 1 raises the front of the cutting head assembly allowing the tire to be mounted. The inner side of the tire tread rests on the lower front roller 4 and the lower rear roller 5. The clamping lever 1 is brought down until the link 2 contacts the stop 6. The tire tread is now clamped between the drive wheel 7 and the lower front roller 4. To make allowance for different tread thickness, the lower front roller 4 is spring loaded by means of the arm 8 and the spring 9. The arm 8 pivots at point B which coincides with the axis of the lower rear roller 5. The clamping force on the tread should be a minimum of 200 lbs. The motor 10 turns the shaft 11 at 300 rpm, with the pillow blocks 12, 13, and 14 supporting the shaft. Since the drive wheel 7 is attached to the shaft 11, the tire will rotate in a clockwise direction (viewing the front of the machine as in FIG. 2). The tire tread is not clamped between the lower rear roller 5 and the upper rear roller 15. The two rollers act as guides to restrict the vertical movement of the tire but not the horizontal movement. This allows the guide rollers 16 and 17 to "steer" the tire to the center of the cutting blades 18 and 19 as described next. Referring to FIG. 3, the guide rollers 16 and 17 are connected to the cutting blades 18 and 19 by the arms 20 and 21 and the blade holders 30 and 31. The cutting handle 22 brings both of the guide rollers and both of the blades against the sidewalls simultaneously by means of the links 23, 24, and 25. Focusing on the outer assembly (16, 18, 20, and 30) the link 23 is connected directly to the handle 22 by the shaft 26 (shown only in FIG. 2) which pivots at point C. Link 23 is attached to the outer blade holder 30 by the link 27 which has pivots at each end. Linear motion is allowed by the slides 28 which travel inside the tubes 29. The screws 32 locate and fasten the cutting blade 18 to the holder, allowing easy blade replacement. The blades are extra heavy duty utility knife blades (0.035 inches thick). The inner assembly (17, 19, 21, and 31) is given linear travel by the link 24 and the link 25 which pivots at point D. All other aspects of the assembly are the same as the outer assembly just described. After the sidewalls have been cut, the handle 22 is pushed to move the cutting assemblies apart and then the clamping lever 1 is raised. The cutting head assembly lifts up (for tread removal) due to the motor 10 acting as a counter-balance to the cutting head assembly.

I claim:

1. A passenger car tire sidewall cutting machine which cuts both sidewalls from a tread of a tire simultaneously and operates independent of tire diameter, tire width, rim bead diameter, tread thickness, and tire construction comprising:
   two lower rollers upon which an inside of the tire tread rests, one of the rollers is fixed and the other is attached to a spring loaded arm;
   an upper roller and a drive wheel attached to a pivoting cutting head with the drive wheel adjacent to the spring loaded lower roller;
   a clamping lever attached to links which are attached to said cutting head to pivot said cutting head and clamp the tread between the drive wheel and the spring loaded lower roller;
   a cutting blade and a cutting blade holder on each side of the the tire attached to said cutting head by means of slides and tubes;
   guide rollers attached to said cutting blade holders; and
   a actuator arm attached to a linkage which is attached to said holders to move the cutting blades linearly inward and outward with respect to said tire by said means of slides and tubes, and to simultaneously move said guide rollers respectively inward and outward with respect to said tire to contact the tire sidewalls to center the tire between said cutting blades.

* * * * *